United States Patent [19]

Thomas et al.

[11] Patent Number: 5,707,590

[45] Date of Patent: Jan. 13, 1998

[54] DETERGENT CONTAINER WITH THERMO-CHROMATIC LEVEL INDICATOR

[75] Inventors: John E. Thomas, River Falls, Wis.; Jody A. Toetschinger, Crystal, Minn.; John E. McCall, Jr., St. Paul, Minn.; Eric R. Balz, Eagan, Minn.

[73] Assignee: Ecolab Inc., St. Paul, Minn.

[21] Appl. No.: 538,734

[22] Filed: Oct. 3, 1995

Related U.S. Application Data

[63] Continuation-in-part of Ser. No. 280,168, Jul. 25, 1994, abandoned, which is a continuation of Ser. No. 112,579, Aug. 25, 1993, Pat. No. 5,385,044.

[51] Int. Cl.⁶ .................................................. G01F 23/22
[52] U.S. Cl. .................. 422/119; 422/263; 422/264; 422/266; 73/295; 116/216; 222/23; 374/54; 206/524.2
[58] Field of Search ............... 73/295, 427; 422/102, 422/106, 119, 263, 264, 266; 116/216; 374/54; 206/524.2, 524.1, 524.6; 222/1, 23, 36, 37, 51, 154

[56] References Cited

U.S. PATENT DOCUMENTS

| | | | |
|---|---|---|---|
| 3,590,371 | 6/1971 | Shaw, Jr. | 324/51 |
| 3,696,675 | 10/1972 | Gilmour | 73/295 |
| 4,144,834 | 3/1979 | Donegan | 116/219 |
| 4,155,695 | 5/1979 | Rohowetz et al. | 260/33.4 |
| 4,156,365 | 5/1979 | Heinmets et al. | 73/343 B |
| 4,358,955 | 11/1982 | Rait | 73/295 |
| 4,426,362 | 1/1984 | Copeland et al. | 422/263 |
| 4,538,926 | 9/1985 | Chretien | 374/150 |
| 4,569,780 | 2/1986 | Fernholz et al. | 252/90 |
| 4,569,781 | 2/1986 | Fernholz et al. | 252/92 |
| 4,687,121 | 8/1987 | Copeland | 222/64 |
| 4,770,859 | 9/1988 | Heiser, Jr. | 422/264 |
| 4,826,661 | 5/1989 | Copeland et al. | 422/106 |
| 4,919,983 | 4/1990 | Fremin | 428/35.7 |
| 5,086,952 | 2/1992 | Kryk | 222/189 |
| 5,099,688 | 3/1992 | de Mars | 73/295 |
| 5,385,044 | 1/1995 | Thomas et al. | 73/295 |

FOREIGN PATENT DOCUMENTS

| | | |
|---|---|---|
| 1 211 003 | 9/1986 | Canada . |
| 0 119 072 | 9/1984 | European Pat. Off. . |
| 0 132 233 | 1/1985 | European Pat. Off. . |
| 3345593 A1 | 4/1985 | Germany . |
| WO 82/01249 | 4/1982 | WIPO . |

OTHER PUBLICATIONS

Coghlan A., *Clothes that change colour in the heat of the moment*, New Scientist, May 11, 1991, p. 25.

Kimmel E.,. *Temperature–sensing materials*, Chemical Engineering, Sep. 5, 1985, pp. 135–138.

*Liquid Crystals—red hot and blue*, The Economist, May 18, 1991, pp. 93–94.

Primary Examiner—Jeffrey Snay
Attorney, Agent, or Firm—Merchant, Gould, Smith, Edell, Welter & Schmidt, P.A.

[57] ABSTRACT

Disclosed is an indicator (15, 35) for determining the level of contents in an opaque, plastic container (10, 30, 40). The container (10, 30, 40) is filled with a solid chemical (11), such as a detergent. A spray of warm or hot water (19) impinges upon the eroding surface (16) of the solid chemical (11) to produce a chemical solution. The container (10, 30, 40) is provided with a thermo-chromatic strip (15, 35) or thermo-chromatic surface (41) for detecting the level of solid chemical (11) within the plastic capsule (10). A method of manufacturing the dispensing container (10, 30, 40) is also disclosed.

10 Claims, 3 Drawing Sheets

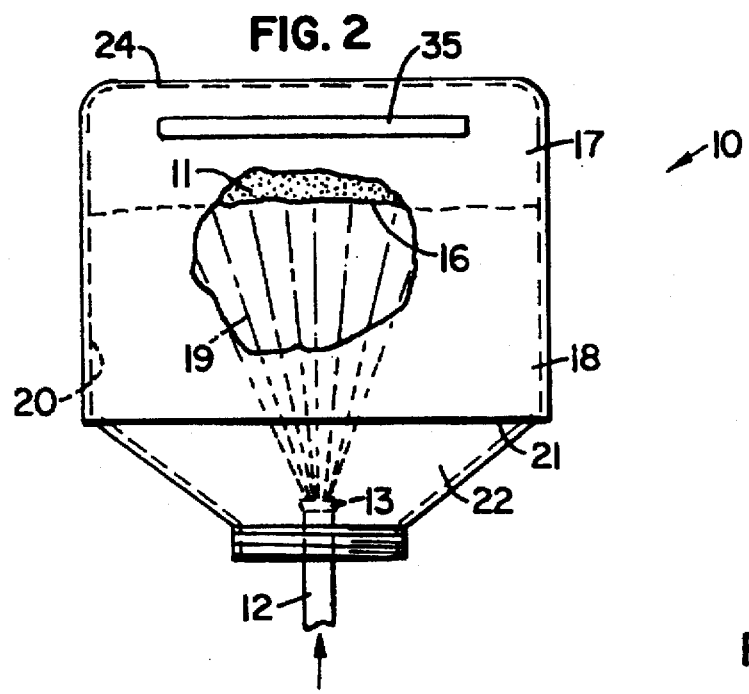
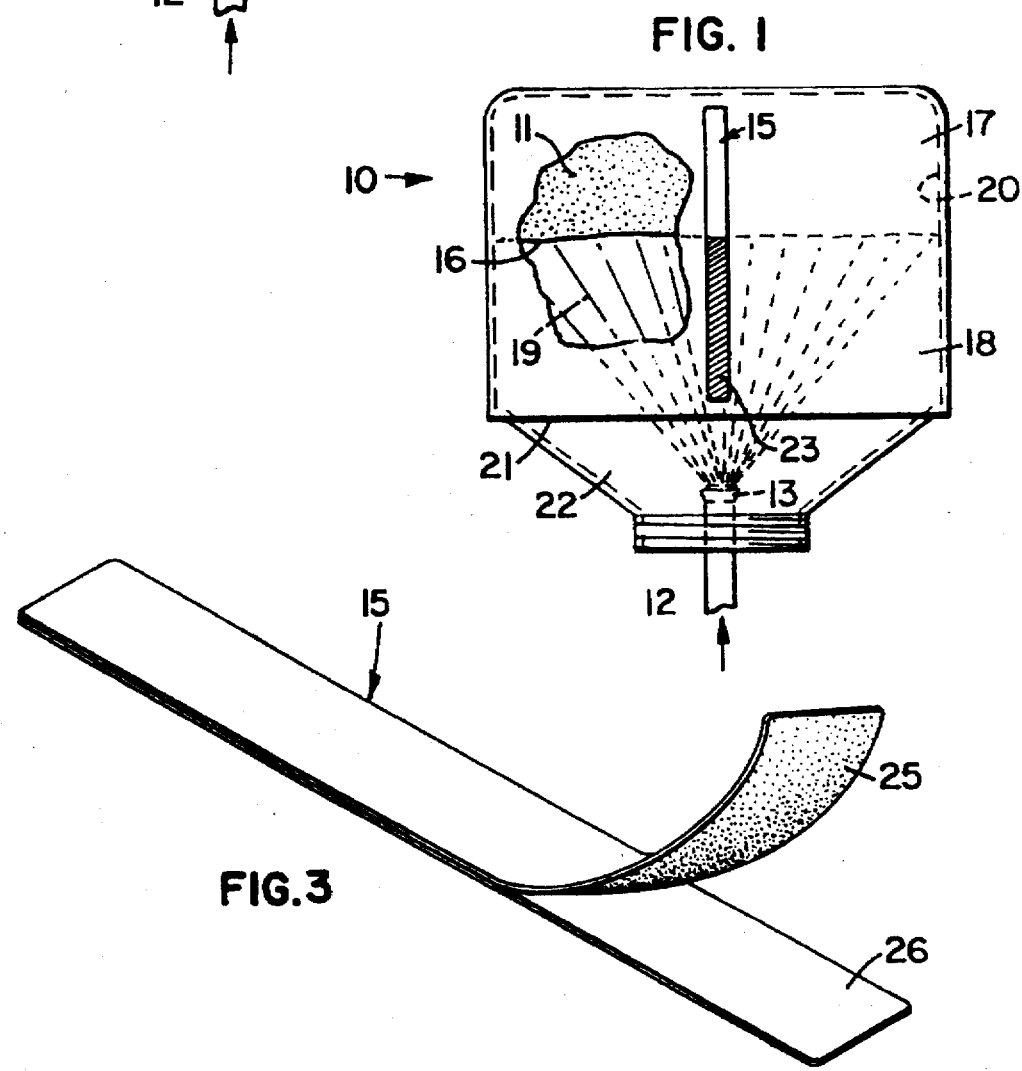

DETERGENT CONTAINER WITH THERMO-CHROMATIC LEVEL INDICATOR

This application is a continuation-in-part of U.S. Ser. No. 08/280,168, Jul. 25, 1994, now abandoned, which was a continuation of U.S. Ser. No. 08/112,579, Aug. 25, 1994 now U.S. Pat. No. 5,385,044.

FIELD OF THE INVENTION

The present invention relates generally to the determination of the level of a solid detergent product in a closed container, and more particularly to the determination of the detergent level by means of a thermo-chromatic substance.

BACKGROUND OF THE INVENTION

Solid detergents are sometimes provided in "cast" or block form, wherein the detergent is cast within a sturdy, plastic container. The container acts as a mold, a shipping and storage container, and a dispenser housing. Dispensing systems for these solids are known in the art. See, for example, U.S. Pat. No. 4,426,362, issued to Copeland et al and commonly owned U.S. Pat. Nos. 4,569,781 and 4,569,780, issued Feb. 11, 1986, to Fernholz et al. The cast detergent is dispensed by spraying a solvent onto the detergent block within the container, thereby dissolving the exposed surface of the detergent to form a concentrated working solution. The concentrated working solution falls into a reservoir or is directed by a conduit to the wash tank of a washing apparatus. When the chemical compound within the capsule is completely utilized, the exhausted capsule is simply discarded and a fully charged container placed in the dispenser. However, hazardous chemicals used in cleaning processes such as highly alkaline detergents are preferably packaged such that they can be dispensed without coming into physical contact with the human body.

A difficulty with the above type of dispenser is that there is no simple way to determine when the capsule is empty and needs to be replaced. In practice, the user must remove the plastic capsule from the dispensing apparatus and visually check the amount of detergent remaining. Alternatively, an automatic detergent sensor may be employed, such as a conductivity sensor to measure the level of detergent in the cleaning solution. However, such a system is relatively expensive, often has high maintenance requirements, and requires auxiliary equipment and electrical circuitry.

Accordingly, a need exists for a dispensing apparatus for a solid block of wash chemical, including a simple, safe, efficient and inexpensive indicator for determining the level of solid detergent remaining in the container and for determining the appropriate time for an empty container to be replaced with a full container.

SUMMARY OF THE INVENTION

The present invention is a detergent-containing container having a thermo-chromatic strip or surface formed integrally with the container. The detergent is a solid cleaning product of the type which is dissolved by impingement of a warm water spray upon the solid chemical. The capsule or container has a product-filled portion and an empty portion, the boundary of which is defined by an eroding surface of the product. A thermo-chromatic strip or surface which is formed integrally with the wall of the container, with at least a portion of the strip or surface overlying the product-filled portion when the container is full. Preferably, the container is made of a plastic material. The thermo-chromatic substance is added to the container's plastic material during the molding process.

Another aspect of the present invention is a method of manufacturing a container which has a thermo-chromatic strip or surface. The steps of the inventive method include: providing a first plastic material which contains a thermo-chromatic additive, providing a second plastic material containing no thermo-chromatic additive, combining the first and second plastic materials in a coextrusion process, and filling the container with a solid detergent.

A primary advantage of the present invention is the ability to determine when a detergent capsule is empty. This enables the user to replace the empty product capsule with a full product capsule at the appropriate time. As a result, the concentration of the detergent solution is maintained at an adequate level. In this manner, the amount of cleaning chemical dispensed can more accurately meet the particular requirements of the situation and allow for better quality and more efficient cleaning. The invention prevents underuse of the cleaning chemical and thereby allows for sufficient cleaning product to be brought to the task.

Additionally, the invention eliminates the time-consuming and imprecise process of manually checking the product level. Furthermore, the invention requires no electronics or complex mechanical components, thereby reducing expense and maintenance requirements.

These features, along with other advantages, will become subsequently apparent, based on the details of construction and operation as more fully described hereinafter.

BRIEF DESCRIPTION OF THE DRAWINGS

Reference is made to the accompanying drawings, wherein like numerals refer to like parts throughout.

FIG. 1 is a side elevational view, partially cutaway, of a first embodiment of a container of the present invention.

FIG. 2 is a side elevational view of a second embodiment of a container of the present invention, partially cutaway.

FIG. 3 is a perspective view of a thermo-chromatic strip utilized with the first and second embodiments of the present invention.

DETAILED DESCRIPTION OF THE PREFERRED EMBODIMENTS

Figure 4:
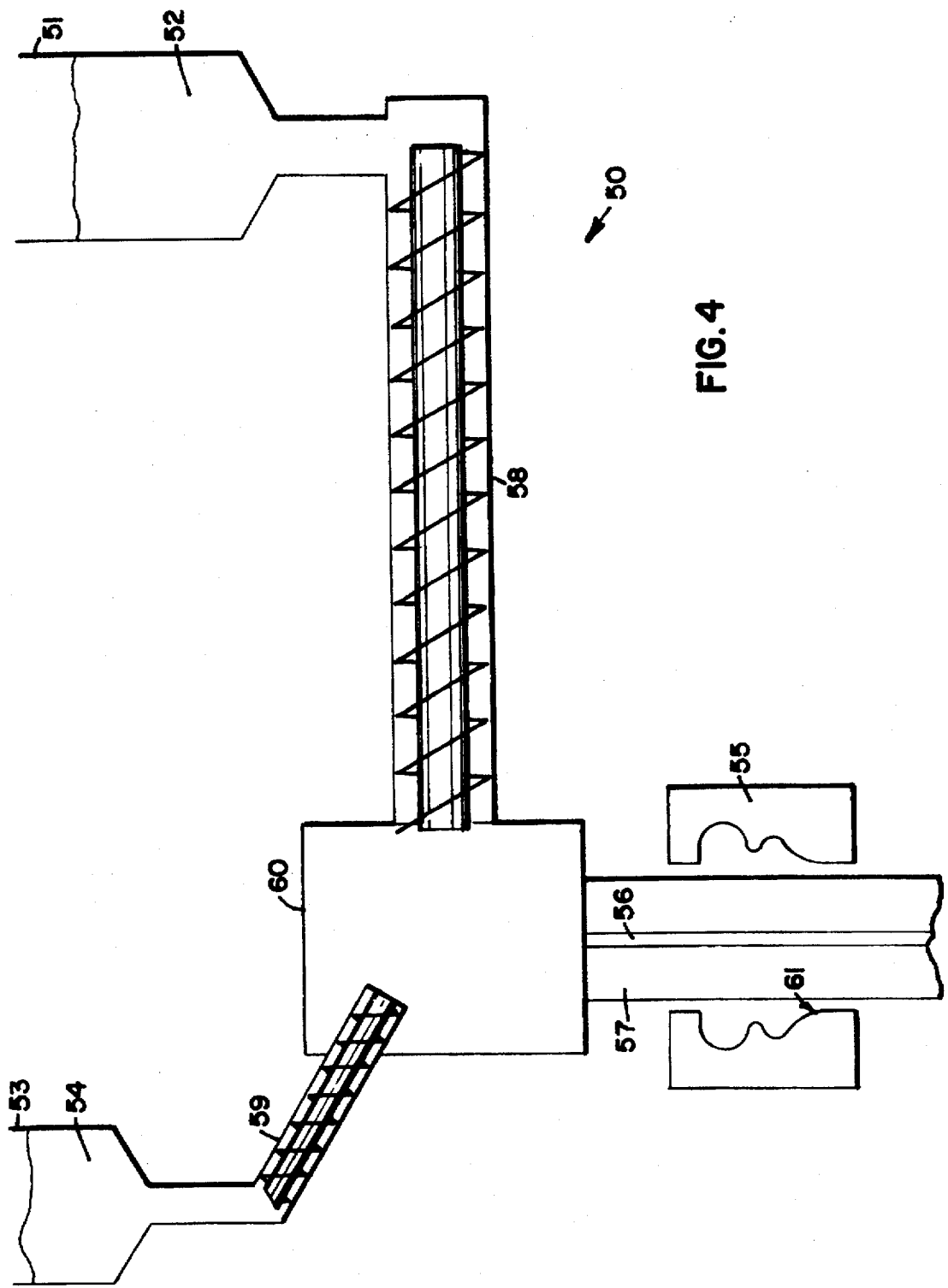
FIG. 4 is a schematic view of the manufacturing process used for the third embodiment of the present invention.

Referring to FIGS. 1 and 2, there is shown an opaque product container or capsule 10. The capsule 10 contains a solid detergent product 11 which is preferably cast within the container 10. Alternatively, the solid product 11 may be in granular or compacted form. The solid product 11 may be a detergent, a rinse aid, a sanitizer, or any other type of suitable composition.

The container 10 has a product-filled portion 17 and an empty portion 18. Preferably, the container 10 serves as the mold and shipping container for the cast detergent 11. The capsule 10 may be made of any number of packaging materials including polymeric packaging materials such as cellophanes, fluorocarbons, polyesters such as polyethylene terephthalate, as well as polyethylenes of various density, polypropylene, polyvinyl chloride, polycarbonate or nylons, polystyrenes, and mixtures thereof. The containers may be transparent, opaque or completely impervious to light.

An inlet line 12 supplies water to the capsule 10, and the water (or other solvent) is directed upwardly through a spray nozzle 13 toward the eroding surface 16 of the detergent product 11. The water spray 19 impinges upon the surface 16 of the solid chemical 11. This causes dissolution of the detergent 11, and the resulting detergent solution may be directed to a utilization point and used for dishwashing, laundry, warewashing, and other applications.

An elongated level indicator is operatively attached to the capsule 10. The level indicator is designated as 15 in FIGS. 1 and 3 and as 35 in FIG. 2. The level indicator or strip comprises a base material (such as "Mylar") which is coated or imbedded with a thermo-chromatic substance. The thermo-chromatic substance varies chromatically with variations in temperature. The base material may be coated with a suitable thermo-chromatic material by painting, stripping, screen printing, or any other suitable or desirable coating method. In the preferred embodiment, the thermo-chromatic substance is reversible. The thermo-chromatic material may be liquid crystal, mercurous oxide or any other suitable or desirable thermo-chromatic material which is responsive in an appropriate temperature range. When liquid crystal is used, it is desirable to apply a coloring substance to the surface of the base material to enhance the optical properties of the liquid crystal. Most preferably the substance is a cholesteric liquid crystal compound on a dark background. The thermo-chromatic substance can be in the form of an ink, a dye, or any other suitable type of carrier.

Exemplary thermo-chromatic materials include those available from Matsui Company as listed below in Table 1:

TABLE I

| MATSUI Type | Color Appears Below (F.°) | Color Disappears Above (F.°) |
| --- | --- | --- |
| 025 | −13.0 | 5.0 |
| 015 | 8.6 | 32.0 |
| 07 | 24.8 | 41.0 |
| 5 | 33.8 | 53.6 |
| 10 | 46.4 | 60.8 |
| 15 | 51.8 | 66.2 |
| 17 * | 57.2 | 73.4 |
| 20 * | 60.8 | 78.8 |
| 25 | 71.6 | 87.8 |
| 27 * | 75.2 | 91.4 |
| 35 * | 80.6 | 96.8 |
| 37 | 89.6 | 105.8 |
| 45 | 104.0 | 122.0 |
| 47 | 111.2 | 136.4 |

* Standard Types

In accordance with the invention, useful thermo-chromatic materials include those which have colors appearing below about 100° F. and disappearing above about 160° F. to 180° F. Such indicators are available from Matsui Company and Merck Ltd. among others. In the preferred embodiment, the thermo-chromatic substance is an ink of the type sold by the Matsui Company of El Segundo, Calif. as Type 45 or Type 47.

Cholesteric liquid crystal compounds exhibit vivid color changes with slight changes in the temperature which is a function of the particular compound selected. The dark background absorbs any light transmitted through the liquid crystal coating and allows the selectively reflected light determined by change in crystal orientation in response to temperature to be observed without light interference. In the presence of light, cholesterics selectively reflect one wave length of light at each angle of reflection. The pattern is reversible; the colors change and reappear as the temperature changes back and forth through a particular range. The chromatic responses occur in the mesophase between that of a crystalline solid and an isotropic or ordinary liquid. This mesophase is referred to as the mesomorphic range or the color-play region of the compound. Response time may be as low as 0.2 seconds.

One example of a compound suitable for use with the present invention is Matsui Type 45 which has a mesomorphic range of 104.0° F. to 122.0° F. This type of material can change from black to white. The thermo-chromatic substance has a characteristic black color at temperatures below 104° F., and the color begins to change to white above 104°. When the temperature reaches 122° F., the substance has changed completely to the white color. The color change reverses as the temperature is lowered. Specifically, the original black color reappears as the temperature is lowered to 104° F., as set forth in Table I.

Although the above example relates to a white and black color change, it is to be understood that other color combinations could be provided. For example, when the strip 15 is activated and the black color disappears, a different color than white may appear. Alternatively, disappearance of the black color could reveal desired wording or graphics, such as the words "Check Product Level."

The thermo-chromatic strip 15 may be positioned in a vertical orientation to extend along the height of the container, as illustrated in FIG. 1, or in a horizontal orientation, as illustrated in FIG. 2. The thermo-chromatic strip 15 could be of any arbitrary shape besides the rectangular shape illustrated, such as a letter.

The thermo-chromatic strip 15 is heat activatable. Because the water utilized with the invention is warm or hot, the thermo-chromatic strip 15 is able to detect the temperature differential which occurs at the interface between the solid detergent 11 and the air beneath the detergent. The temperature of the container wall 20 changes abruptly at the interface between the air and the solid product 11. The interface is defined by the eroding surface 16 of the solid product 11. When the capsule 10 is full, the eroding surface 16 of the chemical is proximate the top 21 of the container's neck portion 22. In this situation, the warm water does not impinge upon the inner surface 20 of the capsule 10 where the strip 15 is located. In other words, the detergent product 11 blocks the warm water spray 19 from the inner wall 20 of the container which the thermo-chromatic strip 15 overlies. Because of this, the thermo-chromatic strip 15 does not change color when the capsule 10 is full.

The water is preferably maintained at a temperature sufficient for activating the thermo-chromatic strip, preferably in the range of 130° F.–140° F. The water temperature should be high enough so that enough detergent product is dissolved, but it should not be so high as to melt the detergent product.

FIG. 1 illustrates that when the capsule 10 is only partially full, the warm water 19 will impinge upon a portion of the thermo-chromatic strip's underlying wall surface 20, thereby resulting in the lower shaded portion 23 of the strip 15 changing color. The change in temperature of the container's wall 20 is readily discernible visually, because of the abrupt change in color of the strip 15 at the eroding surface 16. This permits an observer to readily detect the level of the contents in the container 11.

With the second embodiment illustrated in FIG. 2, the thermo-chromatic strip 35 does not change color until the detergent product 11 has been almost completely depleted. This is because the strip 35 is preferably located near the top 24 of the capsule 10. The strip 35, as shown in FIG. 2, extends horizontally and transversely along the container wall proximate the top of the container 11. Alternatively, the strip 35 could be positioned upon the top surface 24 of the container 11. With the embodiment illustrated in FIG. 2, the strip changes color only when the product level is very low. This may force the user to more readily notice the low product situation, because the color of the strip 15 is not changing every time a dispensing cycle occurs.

As illustrated in FIG. 3, the thermo-chromatic strip 15 may be supplied with a pressure-sensitive adhesive 25 on its reverse side for adhering the strip 15 or 35 to the wall of the container 10. The strip 15, 35 has a removable paper backing 26. To prevent deterioration of the thermo-chromatic strip 15, an optically transparent filter material or clear polymer coat (not shown) may be applied over the strip 15, 35 to protect it from abrasion or other physical damage.

Alternatively, the thermo-chromatic substance could be applied to the capsule 10 in a screen printing operation. This step may take place at the same time a stamped identification label (not shown) on the capsule 10 is applied. With this embodiment, the pressure-sensitive adhesive is not needed.

As another alternative, the plastic container could have a message (e.g. "Replace Container") printed on its exterior wall, with the message being covered by a clearing ink containing a thermo-chromatic substance. The clearing ink is normally black (or another opaque color), and it is capable of changing to clear. When the surface of the solid product recedes to a level above the message, impingement of the warm water on the interior of the container causes the clearing ink to change to clear so as to reveal the message. If an underlying message is not used, the container could have a clear vertical window covered by the black clearing ink. When the thermo-chromatic ink clears, the user could see the level of the colored product through the Clear window (not shown).

Figure 5:
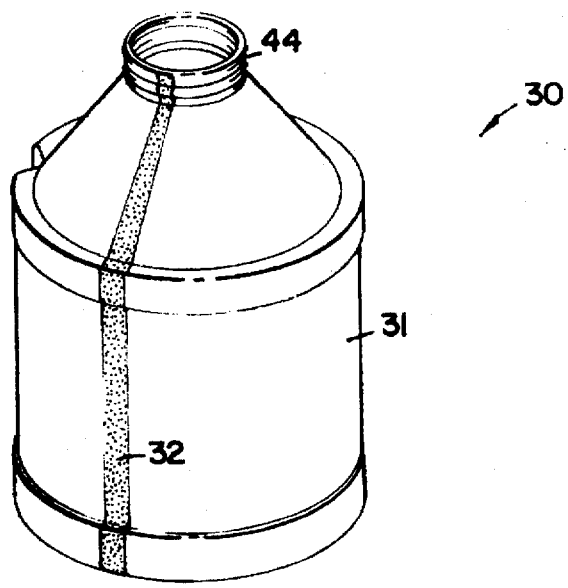
FIG. 5 is a perspective view of a third embodiment of the present invention.

A third embodiment of the container is shown generally at 30 in FIG. 5. The capsule 30 contains a solid detergent product (not shown), and the container 30 has a product-filled portion and an empty portion. The capsule 30 may be made of the materials listed above, but is preferably formed from high density polyethylene or polypropylene. The plastic wall 31 of the container preferably has a dark, opaque color. The container 30 has an elongated level indicator 32, which extends the length of the container 30. The level indicator 32 could be of any desired width. The level indicator 32 contains a thermo-chromatic substance of the type described above.

In the third embodiment, a thermo-chromatic substance is an additive to the level indicator's plastic material, and the strip 32 is formed integrally with the remainder of the container wall 31. The thickness of the container wall 31 is the same thickness of the wall formed by the strip 32, so as to form smooth, continuous internal and external container surfaces. The thermo-chromatic additive is preferably a Type 45 or Type 47 compound sold by the Matsui Company.

Preferably, the level indicator or strip 32 is normally a light, translucent color which, when exposed to warm water, becomes a bright yellow color. However, it is to be understood that many different colors of thermo-chromatic resin could be used.

The integral level indicator strip 32 is formed by a coextrusion process when the plastic container is molded. FIG. 4 is a schematic view of the manufacturing process used to create the container's third embodiment 30. A first hopper 51 contains the plastic pellets 52 of the preferred type, such as polypropylene or polyethylene. The plastic compound may be in the form of powder, granules, or preformed briquettes. The plastic material 52 is transferred by means of an extruder screw 58 into a heated die head 60, where the compound becomes semifluid. A second hopper 53 contains the pigmented plastic 54, which comprises virgin plastic pellets mixed with thermo-chromatic flakes. Preferably, approximately 10% of the pigmented plastic is thermo-chromatic flakes. The virgin plastic in the hopper 53 has a natural, translucent color.

The pigmented plastic is also transferred to the die head 60 by means of an extruder screw 59. From the chamber 60, the two plastic substances 52, 54 are extruded through an annular orifice to form a cylindrical tube or parison 57 having a thermo-chromatic strip 56. A split blow cavity 55 is positioned around the hot plastic, and the mold 55 closes to seal off one end of tube 57. Air is then blown into the tube 57 to expand the plastic to the walls 61 of the cavity 55. The mold cavity is split at a convenient parting line so that the finished container 30 may be ejected. The length of time of the cure varies chiefly upon the thickness of the container wall 31, with increasingly longer cures being required for thicker sections. After the container 30 has been cured and has become rigid, it can be ejected from the mold 55 while still hot.

After the container 30 has be formed, it is ready to been filled with the detergent or other solid material. In addition, suitable graphics may be applied to the container, either by screen printing or adhesive labels.

Figure 6:
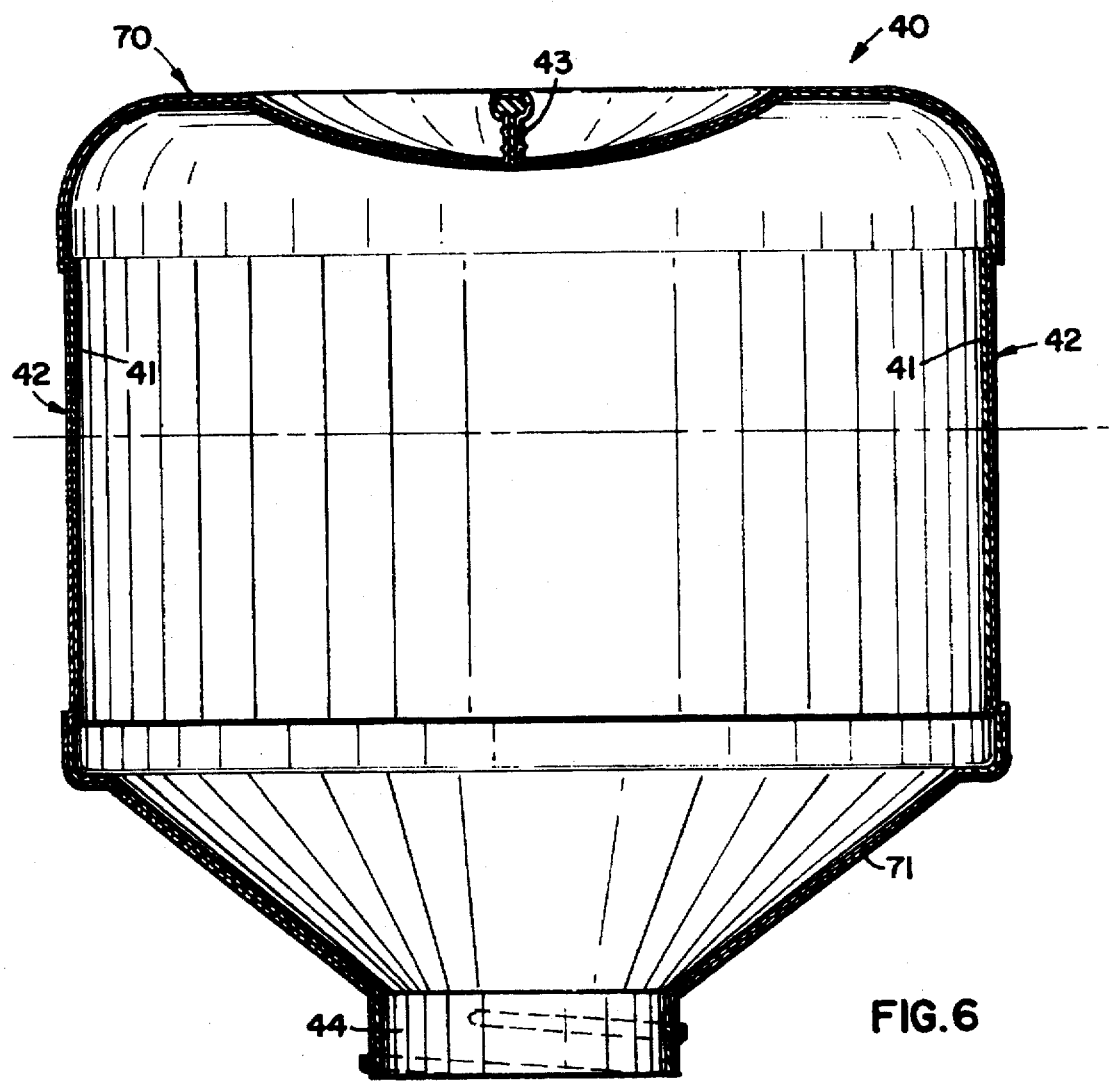
FIG. 6 is a side-elevational, cross-sectional view of a fourth embodiment of the present invention.

The fourth embodiment of the container is shown generally at 40 in FIG. 6. The container 40 is a multilayer blow molded container, with the layers being coextruded so as to form an integral container wall. The containers 30, 40 have the same basic shape as the container 10, described above. Preferably, the containers 30, 40 have a neck 42 and a handle member 43 on the opposite end of the capsule 30.

With the fourth embodiment, at least one wall or surface of the container 40 has an inner, plastic layer 41, and an outer, thermo-chromatic layer 42. That is, the inner layer 41 is formed of a plastic material, and the outer layer 42 is formed of a plastic material which contains a thermo-chromatic additive. In the embodiment illustrated in FIG. 6, all surfaces of the container 40 have this two-layer structure. That is, the container's side wall 31, base surface 70, throat 71, and neck 42 all have the two-layer structure.

It is possible for the container 40 to have more than two layers. For example, there could be three layers, with a middle layer consisting of post consumer resin, i.e., a recycled resin from discarded high density polyethylene and polypropylene containers, sandwiched between a virgin resin layer and a thermo-chromatic pigmented resin layer.

Preferably, the inner layer 41 and outer layer 42 each constitute about 50% of the total amount of plastic used to form the container 40. An increased thickness of the thermo-chromatic layer 42 results in a more dramatic color change in the container 40, because more of the thermo-chromatic substance is present. In use of the fourth embodiment, the bottom, empty portion of the container would be one color, and the product-filled portion of the container would be another color, so that the level of the detergent contents is readily discernable.

Alternatively, the capsule could be formed from a single type of plastic material, and the thermo-chromatic substance could be an additive to the plastic material from which the capsule is formed. With this embodiment, a thermo-chromatic resin is added to the polyethylene or polypropylene prior to molding of the capsule 11, and the resin is dispersed throughout the entire single-layer capsule.

In the preferred embodiments of this invention, the thermo-chromatic resin is reversible. Alternatively, the thermo-chromatic resin may be irreversible, i.e., it may show the "history" of the temperature exposure. With the reversible type of thermo-chromatic resin, a color change to a part of the strip is made during each dispensing cycle, and the color reverts to the "base" or normal color after the dispensing has been completed. With the irreversible type of thermo-chromatic resin, the strip 32 will have a two-color appearance depending upon the location of the eroding surface, even after the dispensing cycle has been completed. The level of the color change between the two colors will vary progressively, depending upon the level of the remaining detergent within the container 30.

Other modifications of the invention will be apparent to those skilled in the art in light of the foregoing description. This description is intended to provide concrete examples of individual embodiments clearly disclosed in the present invention. Accordingly, the invention is not limited to these embodiments or to the use of specific elements therein. All alternative modifications and variations of the present invention which fall within the spirit and broad scope of the appended claims are covered.

What is claimed is:

1. A detergent-containing article of commerce having internal and external surfaces, comprising:
    (a) a container being made of an opaque plastic material, said container having an internal layer and an external layer, both of said layers being made of a plastic material;
    (b) a solid chemical within said container, said chemical being a detergent, said container surrounding and in contact with the detergent on all but one surface thereof, said one surface being an eroding surface; and
    (c) a thermo-chromatic substance dispersed throughout said external layer of said container, said thermo-chromatic substance being selected so as to exhibit a color change of said external layer at the level of said eroding surface responsive to a warm water spray onto said eroding surface of said chemical and onto said internal surface of said container.

2. The article of claim 1, wherein said internal layer and said external layer are formed by a coextrusion process.

3. The article of claim 1, wherein said inner layer extends across all internal surfaces of said container.

4. The article of claim 1, wherein the color change of said thermo-chromatic additive is reversible.

5. The article according to claim 1, wherein said water spray has a temperature of about 120° F. or greater.

6. The article according to claim 1, wherein said thermo-chromatic substance has a temperature activity point ranging from about 100° F. to 180° F.

7. The article according to claim 1, wherein said thermo-chromatic additive has a mesomorphic range of approximately 104° F. to 122° F.

8. The article according to claim 1, wherein said thermo-chromatic additive has a mesomorphic range of approximately 111° F. to 136° F.

9. A method of manufacturing a container which contains a solid block of chemical within an upper portion of said container, said container having at least one internal surface, said solid chemical being a detergent for the washing of dishes, ware, laundry or hard surface, the method comprising the steps of:
    (a) providing a first plastic material, approximately ten percent of said first material comprising a thermo-chromatic additive;
    (b) providing a second plastic material containing no thermo-chromatic additive;
    (c) combining said first and second plastic materials as outer and inner layers, respectively, in a coextrusion process so as to form a hollow container; and
    (d) filling said container with the solid chemical, said chemical having an eroding surface, said thermo-chromatic additive being selected so as to exhibit a color change at the level of said eroding surface responsive to a warm water spray.

10. The method according to claim 9, wherein said second plastic material forms said inner layer which extends across said internal surfaces of said container.

* * * * *